United States Patent
Smith et al.

(10) Patent No.: US 6,513,099 B1
(45) Date of Patent: Jan. 28, 2003

(54) ENHANCED GRAPHICS CACHE MEMORY

(75) Inventors: Jeffery M. Smith, Union City, CA (US); Daniel J. Yau, Los Altos, CA (US)

(73) Assignee: Silicon Graphics Incorporated, Mountain View, CA (US)

(*) Notice: Subject to any disclaimer, the term of this patent is extended or adjusted under 35 U.S.C. 154(b) by 0 days.

(21) Appl. No.: 09/219,108

(22) Filed: Dec. 22, 1998

(51) Int. Cl.[7] ............................................. G06F 12/00
(52) U.S. Cl. ..................... 711/118; 711/119; 711/126; 711/130; 711/147; 711/162; 709/213; 345/501; 345/503; 345/552; 345/555; 345/557; 345/558; 345/582
(58) Field of Search ................................ 711/130, 147, 711/126, 162, 118, 191, 121; 709/213; 345/501, 503, 552, 555, 557, 558, 582

(56) References Cited

U.S. PATENT DOCUMENTS 5,559,952 A      9/1996   Fujitmoto ................... 395/164
5,905,509 A      5/1999   Jones et al. ................. 345/520
5,999,198 A   * 12/1999   Horan et al. ................ 345/521

FOREIGN PATENT DOCUMENTS

EP              0 878 764 A2    11/1998

* cited by examiner

Primary Examiner—Do Hyun Yoo
Assistant Examiner—Jasmine Song
(74) Attorney, Agent, or Firm—Baker Botts L.L.P.

(57) ABSTRACT

A cache for AGP based computer systems is provided. The graphics cache is included as part of a memory bridge between a processor, a system memory and a graphics processor. A cache controller within the memory bridge detects requests by the processor to store graphics data in the system memory. The cache controller stores the data for these requests in the graphics cache and in the system memory. The cache controller searches the graphics cache each time it receives a request from the graphics controller. If the a cache hit occurs, the cache controller returns the data stored in the graphics cache. Otherwise the request is performed using the system memory. In this way the graphics cache reduces the traffic between the system memory and the memory bridge, overcoming an important performance bottleneck for many graphics systems.

28 Claims, 2 Drawing Sheets

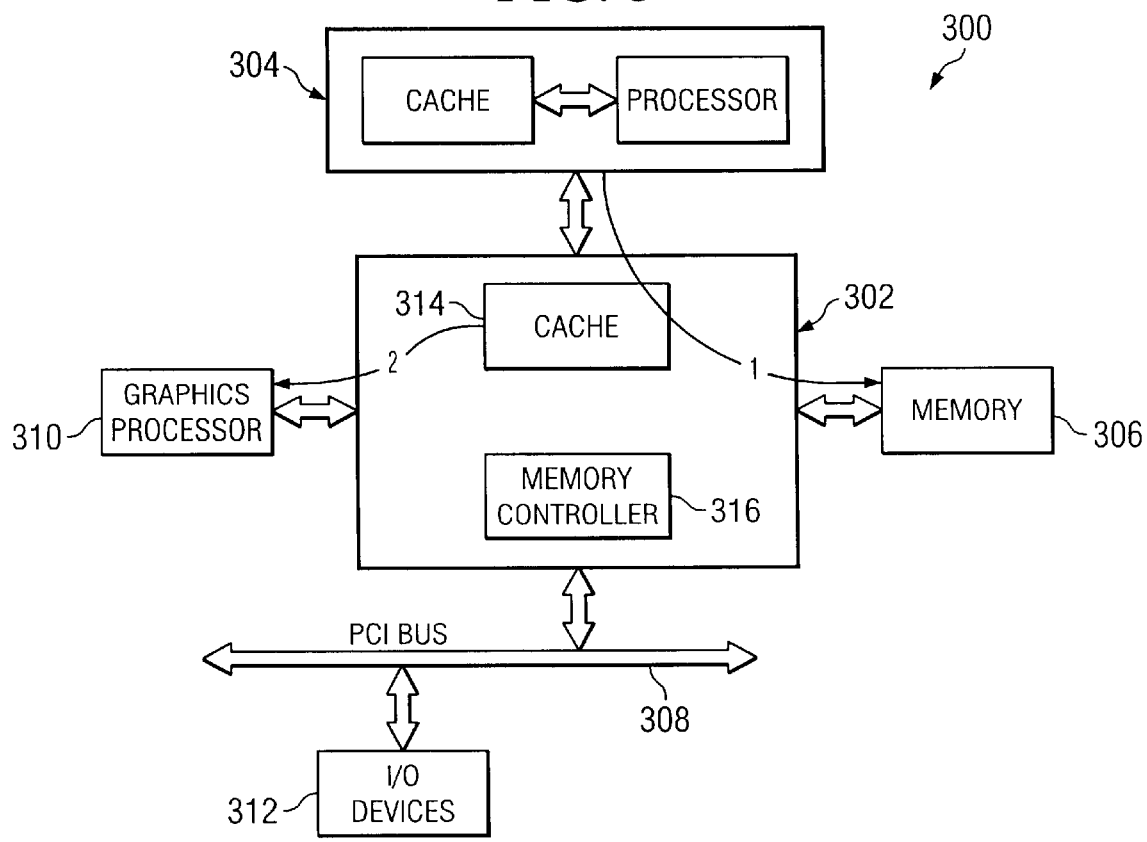

ENHANCED GRAPHICS CACHE MEMORY

FIELD OF THE INVENTION

The present invention relates generally to systems for computer graphics. More specifically, the present invention includes a method and apparatus for increasing the graphics throughput of systems that use an Accelerated Graphics Port (AGP) or other memory interconnect.

BACKGROUND OF THE INVENTION

FIG. 1 is a block diagram of a typical PCI-based personal computer system. For this type of architecture, a PCI bridge is positioned at the center of a processor/cache combination, a system memory, and a PCI bus. Each of these components has its own connection to the PCI bridge. This allows the PCI bridge to act as a gateway between the microprocessor/cache combination, system memory, and PCI bus. The PCI bus provides points of attachment for a graphics processor and other I/O devices.

At the time of their introduction, the PCI based personal computers were a vast improvement over more traditional PC architectures. The improvement was due largely to the high speed of the PCI bus. This greatly improved the bandwidth available to perform I/O tasks. This increased bandwidth lead to the introduction of faster I/O devices, designed to further exploit of the capabilities of the PCI bus.

Unfortunately, the bandwidth required for these improved I/O devices has largely eroded the capacity of the PCI bus. Graphics processors are a key part of this problem. Graphics processors are increasingly used in way that requires large amounts of data to be transferred between system memory and the graphics processor itself. These data transfers tend to tie up the PCI bus and starve the remaining I/O devices.

To overcome these limitations, many PC manufactures have adopted AGP (advanced graphics port) based architecture. As shown in FIG. 2, The AGP architecture is not unlike the PCI architecture of FIG. 1. The AGP architecture is improved, because the graphics processor is no longer attached to the PCI bus. Instead, the graphics processor is now provided with its own dedicated connection to the AGP bridge.

The dedicated connection between the graphics processor and AGP bridge increases the rate at which data can be transferred to the graphics processor. At the same time, contention on the PCI bus is reduced. The overall result is that AGP based personal computer offer a significant performance increase over even PCI based systems.

At the same time, even AGP based systems suffer from performance bottlenecks. One of these bottlenecks arises when a graphics application creates and then stores large textures in the system memory. For many graphics applications, these textures can be quite large, extending over many megabytes. These textures are also subject to interactive modification. This allows the textures to be interactively changed for simulation and other environments. The generation and modification of textures creates considerable traffic between the microprocessor/cache combination and the system memory. At the same time, the graphics processor may be accessing the generated textures or other data within the system memory. As a result, a performance bottleneck arises at the interface between the system memory and the AGP bridge.

For these reasons, a need exists for a system that reduces or alleviates the performance bottleneck at the interface between the system memory and the AGP bridge. This need is particularly great for systems that are intended for high-performance graphics applications where large textures are stored, modified and accessed in a system memory.

SUMMARY OF THE INVENTION

The present invention provides a graphics cache memory that accelerates throughput within a memory bridge, such as AGP. The graphics cache is positioned within the memory bridge and intercepts graphics data that is generated by a processor/cache combination for storage in a system memory. The graphics cache is searched each time that the graphics processor requests data from the system memory. Successful searches result in the requested data being retrieved from the graphics cache. Unsuccessful searches result in the requested data being retrieved directly from the system memory.

The graphics cache is preferably updated following each successful search and retrieval to indicate that the retrieved data is no longer cached. This read-once strategy simplifies the cache structure and allows the memory within the graphics cache to be rapidly reused. The rapid reuse means that a relatively small cache may be used to create a relatively large performance increase.

In this way the present invention provides a system that reduces the overall amount of traffic passing between the memory bridge and the system memory. This reduces or alleviates the bottleneck created by graphics data traversing this interface.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 3 is a block diagram of the cache memory of the present invention deployed in an AGP based computer system.

DETAILED DESCRIPTION OF THE PREFERRED EMBODIMENTS

Figure 1:
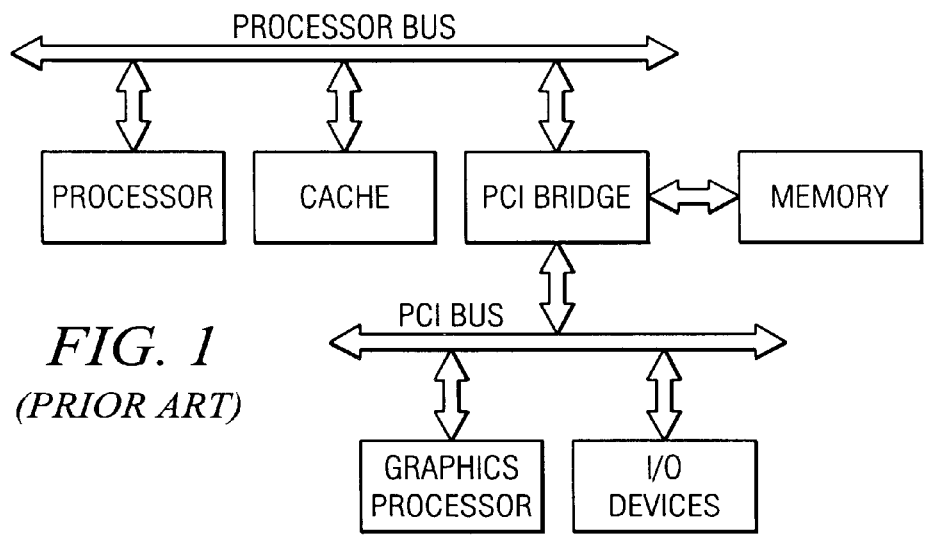
FIG. 1 is a block diagram of a PCI based computer system shown as prior art for the present invention.
Figure 2:
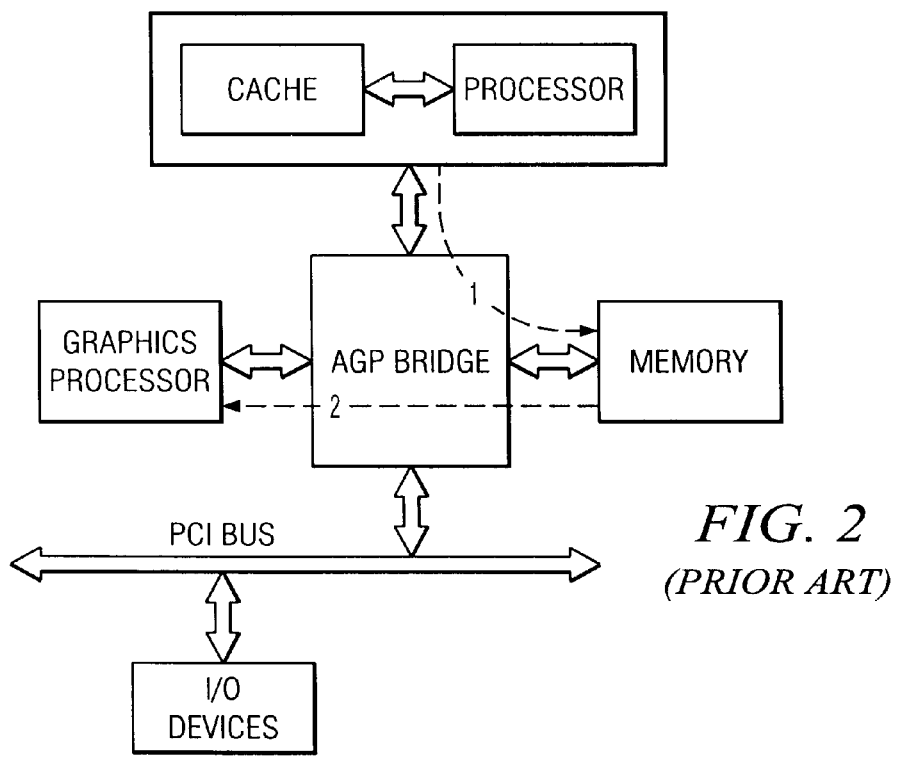
FIG. 2 is a block diagram of an AGP based computer system shown as prior art for the present invention.

Reference will now be made in detail to preferred embodiments of the invention, examples of which are illustrated in the accompanying drawings. Wherever convenient, the same reference numbers will be used throughout the drawings to refer to the same or like parts.

Environment

In FIG. 3, an AGP based computer system 300 is shown as a representative environment for the present invention. Structurally, computer system 300 includes a memory bridge 302 positioned at the center of a processor cache combination 304, a system memory 306, a PCI bus 308 and a graphics processor 310. Each of these components has its own connection to memory bridge 302. This allows memory bridge 302 to act as a gateway between microprocessor/cache combination 304, system memory 306, PCI bus 308 and graphics processor 310. PCI bus 308 provides points of attachment for a range of I/O devices of which I/O device 312 is representative. In general, it should be emphasized that the particular example of FIG. 3 is entirely representative in nature. Thus, the present invention is specifically intended to be deployable within a range of different bridge architectures, of which AGP is only a single example.

Graphics Cache

Memory bridge 302 includes a cache memory 314 and a cache controller 316. Cache memory 314 and cache Controller 316 are preferably included as part of the same chip or chipset that implements memory bridge 302. Cache controller 316 accepts memory requests from processor cache combination 304, PCI bus 308 and graphics processor 310. Cache controller 316 translates these requests into appropriate interactions with system memory 306.

Cache controller 316 is configured to detect requests to store graphics data received from processor cache combination 304. In general, there are several different techniques that allow requests of this type to be detected. One technique is to reserve one or more special areas within system memory 306 for graphics data. Cache controller 316 would detect requests to store data within these areas. A second technique is to configure processor cache combination 304 to use a special type of operation to store graphics data. In cases where processor cache combination 304 is an INTEL PENTIUM II processor, the special operation will typically be a write combining store. The cache controller would then detect the write combining store. Other embodiments may use still different techniques to detect stores of graphics data.

Cache controller 316 stores a copy of each detected store of graphics data to cache memory 314. Cache controller 316 also queues each detected store of graphics data for storage in system memory 306. In this way, stores of graphics data are sent to cache memory 314 and system memory 306.

Cache controller 316 is configured to search cache memory 314 each time a memory request is received from graphics processor 310. A cache hit occurs when cache controller determines that requested data is located in cache memory 314. In these cases, cache controller 316 performs the memory request by retrieving the requested data from cache memory 314. Cache controller 316 also updates cache memory 314 so that retrieved data is no longer shown as being located in cache memory 314. For typical cache architectures, cache controller 316 accomplishes this by invalidating the areas within cache memory 314 where retrieved data had been stored. In the alternative (i.e., where data for a memory request cannot be located in cache memory 314) a cache miss occurs. Cache controller 316 handles cache misses by queuing the requested operation to be performed by system memory 306.

As described above, cache controller 316 manages cache memory 314 using a read-once policy. This allows cache memory 314 to be rapidly reused, reducing the amount of memory required to effectively implement cache memory 314. It should be appreciated, however, that different caching strategies may be used.

In this way the present invention provides a system that reduces the overall amount of traffic passing between memory bridge 302 and system memory 306. Textures and other graphics data generated by processor cache combination 304 are temporarily stored in cache memory 314. This allows these textures and other graphics data to be quickly retrieved by graphics processor 310. The overall effect is that contention for system memory 306 is reduced, thereby lessening or eliminating the bottleneck between system memory 306 and memory bridge 302.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for transferring graphics data between a host processor and a graphics processor within a computer system, comprising:

generating, by the host processor, a request to store graphics data in a system memory;

detecting, by a cache controller, the request to store graphics data in the system memory;

storing, by the cache controller, graphics data associated with the request in a cache memory in response to detecting the request;

queuing, by the cache controller, graphics data associated with the request for storage in the system memory;

storing queued graphics data associated with the request into the system memory independent of the cache memory;

requesting, by the graphics processor, a retrieval of requested graphics data from the system memory;

determining whether the requested graphics data is stored in the cache memory;

returning the requested graphics data to the graphics processor from the cache memory subsequent to the cache controller determining that the requested graphics data is stored in the cache memory;

returning the requested graphics data to the graphics processor from the system memory independent of the cache memory subsequent to the cache controller determining that the requested graphics data is not stored in the cache memory.

2. The method of claim 1, further comprising:

configuring, by the cache controller, the cache memory to indicate that the requested data is stored in the cache memory.

3. The method of claim 1, wherein the request to store graphics data is a write combining store.

4. The method of claim 1, further comprising:

searching, by the cache controller, the cache memory to determine if the requested data is stored in the cache memory.

5. The method of claim 1, wherein the graphics data is a graphics texture.

6. The method of claim 1, wherein the computer system is based on the AGP architecture.

7. A graphics cache for use in a memory bridge that interconnects a host processor, a graphics processor, and a system memory, the graphics cache comprising:

a cache memory; and a cache controller, the cache controller including:

means for detecting requests to store graphics data in the system memory;

means for storing graphics data in the cache memory;

means for queuing graphics data for storage in the system memory in response to detecting the requests;

means for storing queued graphics data into the system memory independent of the cache memory;

means for detecting requests for retrieval of requested graphics data from the system memory;

means for determining whether the requested graphics data is stored in the cache memory;

means for providing the requested graphics data from the cache memory subsequent to determining that the requested graphics data is stored in the cache memory;

means for providing the requested graphics data from the system memory independent of the cache memory subsequent to determining that the requested graphics data is not stored in the cache memory.

8. The graphics cache of claim 7, wherein the cache controller further includes means for configuring the cache memory to indicate that the requested data is stored in the cache memory.

9. The graphics cache of claim 7, wherein the requests to store graphics data in the system memory indicates a write combining store.

10. The graphics cache of claim 7, wherein the cache controller further includes means for searching the cache memory to determine if the requested data is stored in the cache memory.

11. The graphics cache of claim 7, wherein the graphics data is a graphics texture.

12. The graphics cache of claim 7, wherein the memory bridge is based on the AGP architecture.

13. A graphics cache for use in a memory bridge that interconnects a host processor, a graphics processor, and a system memory, the graphics cache comprising:

a cache memory; and a cache controller, the cache controller configured to detect requests to store graphics data in the system memory, the cache controller configured to store within the cache memory graphics data in response to the requests, the cache controller configured to queue graphics data associated with the requests for storage in the system memory, the cache controller configured to store queued graphics data into the system memory independent of the cache memory, the cache controller further configured to retrieve previously stored graphics data from the cache memory for supply to the graphics processor, the cache controller further configured to update the cache memory to indicate that the previously stored graphics data is no longer stored in the cache memory upon providing the previously stored graphics data from the cache memory to the graphics processor, the cache controller further configured to retrieve previously stored graphics data from the system memory independent of the cache memory for supply to the graphics processor subsequent to detecting that the graphics data is not present in the cache memory.

14. A method for transferring data in a computer system, comprising:

receiving data and a storage request to store the data;

detecting whether the storage request indicates that the data is to be selectively stored;

queuing the data for storage in a system memory;

storing the data in a cache memory in response to the storage request indicating that the data is to be selectively stored;

storing queued data into the system memory independent of the cache memory.

15. The method of claim 14, further comprising:

receiving a retrieval request to retrieve the selectively stored data from the system memory;

determining whether the cache memory includes the selectively stored data requested by the retrieval request.

16. The method of claim 15, further comprising:

providing an indication that the selectively stored data requested by the retrieval request is stored in the cache memory.

17. The method of claim 15, further comprising:

providing an indication that the selectively stored data requested by the retrieval request is no longer stored in the cache memory.

18. The method of claim 15, further comprising:

providing the selectively stored data from the cache memory in response to determining that the cache memory includes the selectively stored data.

19. The method of claim 15, further comprising:

retrieving the selectively stored data from the system memory and independent of the cache memory in response to determining that the selectively stored data is not stored in the cache memory.

20. The method of claim 14, wherein the detecting step includes identifying that the data is to be stored in a reserve area of the system memory.

21. The method of claim 14, wherein the detecting step includes identifying the storage request as a special operation.

22. The method of claim 14, wherein the data to be selectively stored is graphics data and the storage request is a request to store the graphics data.

23. A memory bridge in a computer system, comprising:

a cache controller operable to receive data and a storage request to store the data, the cache controller operable to detect whether the data is to be selectively stored, the cache controller operable to queue the data for storage in a system memory;

a cache memory coupled to the cache controller, the cache controller operable to store the data in the cache memory in response to a determination that the data is to be selectively stored, the cache controller operable to store queued data in the system memory independent of the cache memory.

24. The memory bridge of claim 23, wherein the cache controller is operable to receive a retrieval request to retrieve the selectively stored data from the system memory, the cache controller operable to determine whether the selectively stored data is stored in the cache memory.

25. The memory bridge of claim 24, wherein the cache controller is operable to provide an indication of whether the selectively stored data is stored in the cache memory.

26. The memory bridge of claim 24, wherein the cache controller is operable to provide the selectively stored data from the cache memory in response to determining that the selectively stored data is stored in the cache memory.

27. The memory bridge of claim 24, wherein the cache controller is operable to initiate retrieval of the selectively stored data from the system memory independent of the cache memory in response to determining that the selectively stored data is not stored in the cache memory.

28. The memory bridge of claim 23, wherein the data to be selectively stored is graphics data and the storage request is a request to store the graphics data.

* * * * *